R. MAXWELL.
Churn.
No. 9,218.
Patented Aug. 24, 1852.
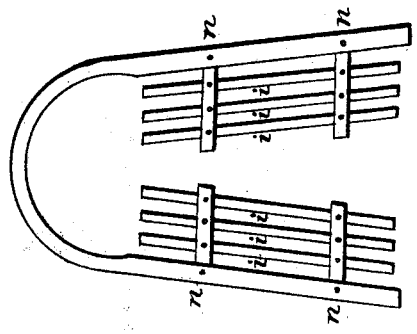
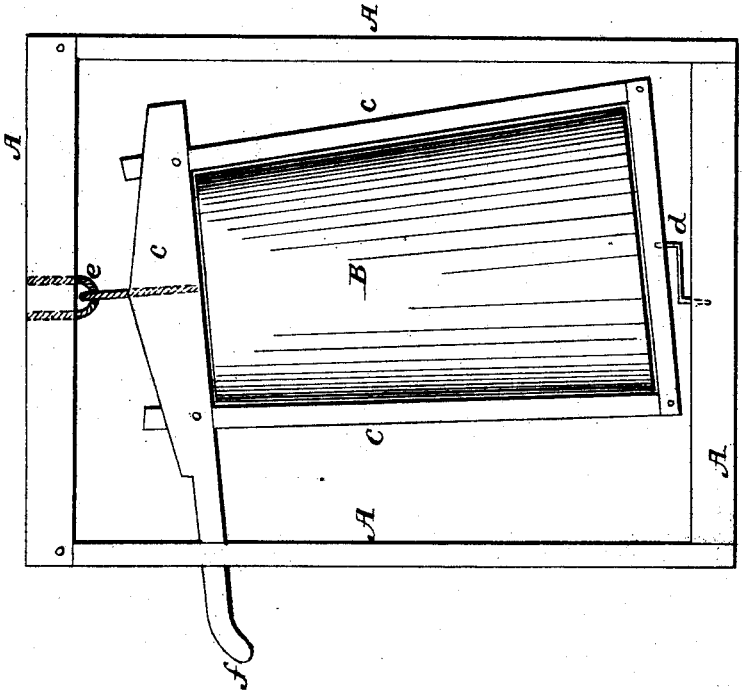

UNITED STATES PATENT OFFICE.

RUFUS MAXWELL, OF WESTON, VIRGINIA.

CHURN.

Specification of Letters Patent No. 9,218, dated August 24, 1852.

*To all whom it may concern:*

Be it known that I, RUFUS MAXWELL, of the county of Lewis and State of Virginia, have invented a new and useful Improvement in Churns; and I do hereby declare the following is a full, clear, and exact description of the construction and operation of the same, reference being had to the annexed drawings, making a part of this specification, in which—

Figure 1, is a side elevation. Fig. 2, is a side elevation of the rack.

A A A A is a supporting frame, inside of which the frame $c\ c\ c$ is suspended by a hook and staple $e$.

B is a churn, fastened in the frame $c\ c\ c$ at pleasure.

$f$ is the handle, being an extension of the top piece of the frame $c\ c\ c$, and works vertically through a post of the supporting frame.

$d$ is a crank, connecting the frame $c\ c\ c$ with the supporting frame, so that the center of the bottom of the churn may revolve about a circle, (five or six inches in diameter). And this motion causes the milk to flow rapidly around the churn. Then I provide a rack for the purpose of breaking this current, thus causing commotion and friction. This rack consists of a piece of tough elastic wood, bent as represented at Fig. 2, so that it will press against the sides of the churn, thus holding the rack in a stationary position, (with respect to the churn). Then, four pins are inserted in this bow at $n$, $n$, $n$, $n$. Parallel rods $i$, $i$, $i$, etc., about one half an inch apart, are fastened to these pins, by boring holes through them and inserting the rods therein.

I claim—

1. The forcing of the milk through a rack by revolving the churn in an orbit, without turning it on axis.

2. The bow and rods connected together as above described.

RUFUS MAXWELL.

Witnesses:
   J. DARLINTON,
   THOS. S. WOOD.